Dec. 30, 1952      L. ASTAR      2,623,568
NONSKID DEVICE
Filed Jan. 27, 1950
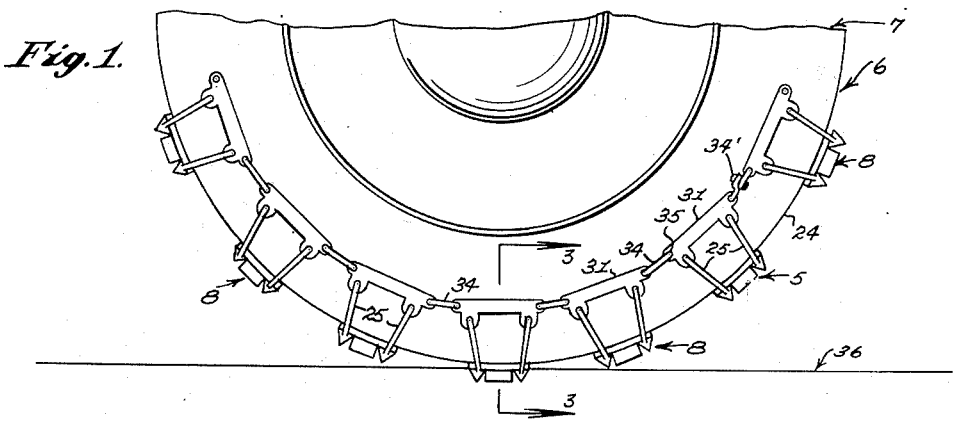
*Fig. 1.*
*Fig. 3.*
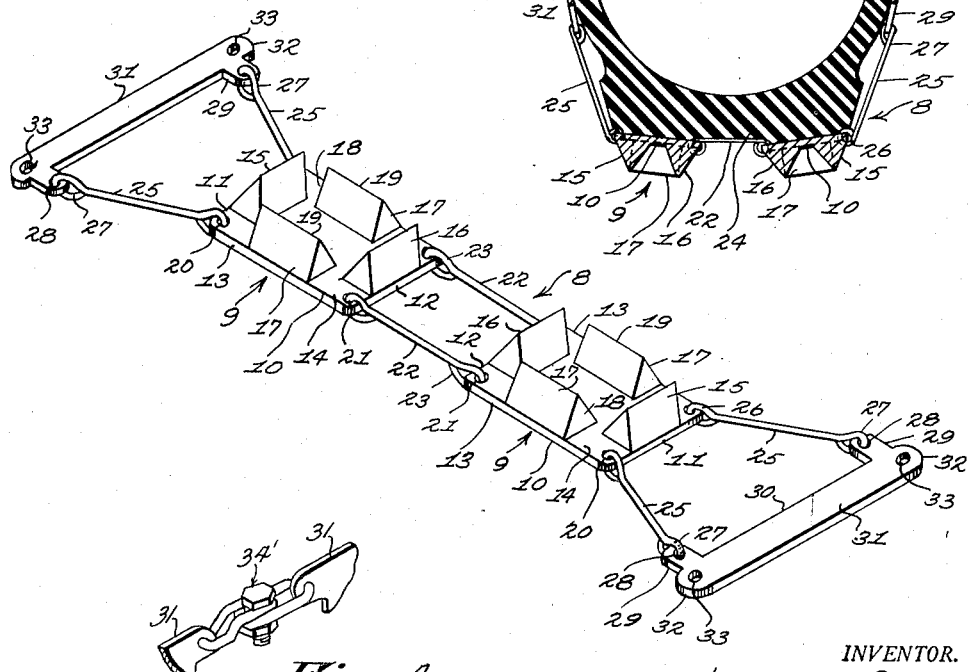
*Fig. 2.*
*Fig. 4.*
INVENTOR.
LAURENCE ASTAR
BY
McMorrow, Berman & Davidson
ATTORNEYS Patented Dec. 30, 1952

2,623,568

UNITED STATES PATENT OFFICE 2,623,568

NONSKID DEVICE

Laurence Astar, Oneonta, N. Y.

Application January 27, 1950, Serial No. 140,839

4 Claims. (Cl. 152—227)

This invention relates to an improved nonskid device for pneumatic tired vehicle wheels, the primary object of the invention being to provide a more practical, efficient, and long wearing device of this kind which affords more positive protection against both forward and rearward and sidewise skidding of vehicles on slick or icy surfaces.

Another important object of the invention is to provide a device of the character indicated above which can be more easily and efficiently manufactured in a serviceable and attractive form at relatively low cost.

Other important objects and advantageous features of the invention will be apparent from the following description and the accompanying drawings, wherein, merely for purposes of illustration herein, a specific embodiment of the invention is set forth in detail.

In the drawings:

Figure 1 is a fragmentary side elevation, showing the illustrated device applied to the pneumatic tire of a vehicle wheel.

Figure 2 is an enlarged bottom perspective view of one of the nonskid units of the device.

Figure 3 is an enlarged vertical transverse section taken on the line 3—3 of Figure 1, and Figure 4 is a perspective view of one of the unit connecting links.

Referring in detail to the drawings, wherein like numerals designate like parts throughout the several views, the numeral 5 generally designates the illustrated nonskid chain device, applied to the pneumatic tire 6 on the vehicle wheel 7, and comprising a plurality of similar and equally circumferentially spaced units 8.

Each unit 8 comprises a pair of similar laterally spaced elements 9, each comprising a rectangular plane plate 10, slightly elongated in a direction across the tire 6 and having outer and inner end and edges 11 and 12, respectively, and longitudinal side edges 13.

Cast on or otherwise suitably secured on the outer surface 14 of the plate 10 are outer and inner end lugs 15 and 16, respectively, and longitudinal lugs 17, 17. These lugs are of isosceles triangular cross section and of substantially the same cross sectional size and length and are positioned on the plate 10 with one edge of each lug substantially flush with the plate edge, adjacent thereto. The plate 10 is dimensioned so that the longitudinal lugs 17 are substantially and equally spaced from the outer and inner ends of the plate and are spaced inwardly from the adjacent edges of the outer and inner end lugs 15 and 16, respectively. The end lugs are equally spaced from the side edges 13 of the plate 10 with the ends 18 of the end lugs aligned with the apices 19 of the longitudinal lugs 17, as indicated in Figure 3.

The plates 10 are formed in the corners of their outer and inner end edges 11 and 12, respectively, with holes 20, 20 and 21, 21 respectively. Wire assembling links 22 having welded eyes or loops 23 at their opposite ends freely engaged through the inner holes 21, 21 with links parallel. The length of the links 22 is such that when the device is installed the units 8 are positioned at the opposite sides of the thread 24 of the tire 6, as shown in Figure 3.

Converging attaching links 25, 25 consist preferably of heavy wires having inner loops or eyes 26, 26 freely engaged through the outer end holes 20, 20 of the plates 10, and outer eyes or loops 27 freely engaged through holes 28 formed in inwardly projecting lugs 29 on the opposite ends of the inner edge 30 of an attaching bar 31 having rounded ends 32 formed with holes 33 located longitudinally outwardly from the lugs 29. The spacing of the lugs 29 being greater than the spacing of the outer plate holes 20, the links 25, 25 diverge outwardly, as shown in Figure 2, the links 25 and the bars 31 thereby providing wider and more stable engagement with the sides of the tire 6.

The individual units 8 are connected to adjacent units by means of short connecting links 34, positioned at the outer sides of the bars 31 and having inwardly directed ends 35 freely engaging the holes 33 in the ends 32 of the bars 31. The length of the links 34 is such that the units 8 are sufficiently closely circumferentially spaced around the tire 6 so that, as shown in Figure 1, with one unit 8 fully engaged with the road surface 36, the preceding and following units 8 will be in impartial, angulated engagement with the road surface. As the wheel 7 turns between the partially engaged and fully engaged positions of adjacent units 8, there is a camming action of the units, as they move into full road engaging position which causes the longitudinal lugs 17 to bite into ice on the road surface in a manner to preclude skidding in forward or rearward directions. The engagement of the end lugs 15 and 16 with the road surface 36 precludes sidewise skidding in either lateral direction. One or more pairs of the unit connecting links 34' may be employed of a suitable readily detachable or separable form, Figure 4, to facilitate installation and removal of the device. It will be observed that the assembling links 22 remain out of wearing contact with the road surface 36 until the lugs 15 and 16 and 17 have been worn down about sixty percent.

What is claimed is:

1. In a non-skid chain for a vehicle wheel tire having a tread and sidewalls, a plurality of non-skid units adapted to engage across the tire tread in circumferentially spaced relation to each other around the tire, each unit comprising a pair of rigid substantially rectangular plates arranged to occupy positions across and in engagement with the tire tread, said plates having laterally inward ends in spaced relation, first link means extending between and flexibly connected to the laterally inward ends of the plates and serving to space the plates, the surfaces of the plates remote from the tire tread being formed with first edged lugs extending along the laterally inward and laterally outward ends of the plates and with second edged lugs extending along the sides of the plates between said first lugs, second link means flexibly connected at one end to the laterally outward ends of the plates and arranged to extend across the tire sidewalls, and rigid bars arranged to extend longitudinally along the tire sidewalls in laterally spaced relation to the laterally outward ends of said plates and to which the other ends of said second link means are flexibly connected, and third link means extending between and flexibly connected to the adjacent ends of the bars of adjacent units.

2. In a non-skid unit for a tire chain, a pair of rigid substantially rectangular plates arranged to occupy positions on the opposite marginal edges of the tread of a tire, said plates having laterally inward ends spaced from each other in a direction across the tire tread, first link means extending between and flexibly connected to the laterally inward ends of the plates, the surfaces of said plates remote from the tire tread being formed with first elongated edged lugs extending along the laterally inward and laterally outward ends of the plates and with second elongated edged lugs extending along the sides of the plates between said first lugs, elongated rigid bars arranged to extend along the tire sidewalls in laterally spaced relation to the laterally outward ends of the plates, and second link means extending between and flexibly connected to the laterally outward ends of the plates and to said bars.

3. In a non-skid unit for a tire chain, a pair of rigid substantially rectangular plates arranged to occupy positions on the opposite marginal edges of the tread of a tire, said plates having laterally inward ends spaced from each other in a direction across the tire tread, first link means extending between and flexibly connected to the laterally inward ends of the plates, the surfaces of said plates remote from the tire tread being formed with first elongated edged lugs extending along the laterally inward and laterally outward ends of the plates and with second elongated edged lugs extending along the sides of the plates between said first lugs, elongated rigid bars arranged to extend along the tire sidewalls in laterally spaced relation to the laterally outward ends of the plates, and second link means extending between and flexibly connected to the laterally outward ends of the plates and to said bars, said second link means consisting of a pair of link elements having laterally inward ends connected to the laterally outward ends of the plates, said link elements having laterally outward ends connected to said bars at spaced points along the bars.

4. In a non-skid unit for a tire chain, a pair of rigid substantially rectangular plates arranged to occupy positions on the opposite marginal edges of the tread of a tire, said plates having laterally inward ends spaced from each other in a direction across the tire tread, first link means extending between and flexibly connected to the laterally inward ends of the plates, the surfaces of said plates remote from the tire tread being formed with first elongated edged lugs extending along the laterally inward and laterally outward ends of the plates and with second elongated edged lugs extending along the sides of the plates between said first lugs, elongated rigid bars arranged to extend along the tire sidewalls in laterally spaced relation to the laterally outward ends of the plates, and second link means extending between and flexibly connected to the laterally outward ends of the plates and to said bars, said second link means consisting of a pair of link elements having laterally inward ends connected to the laterally outward ends of the plates, said link elements having laterally outward ends connected to said bars at spaced points along the bars, said first link means consisting of a pair of link elements having ends connected to the laterally inward ends of the plates at spaced points along the laterally inward ends of the plates.

LAURENCE ASTAR.

REFERENCES CITED

The following references are of record in the file of this patent:

UNITED STATES PATENTS

| Number | Name | Date |
|---|---|---|
| 1,155,413 | Gannett | Oct. 5, 1915 |
| 1,999,944 | Peterson | Apr. 30, 1935 |
| 2,057,936 | Centofanti | Oct. 20, 1936 |